(12) United States Patent
Chen (10) Patent No.: US 10,404,915 B1
(45) Date of Patent: Sep. 3, 2019

(54) METHOD AND SYSTEM FOR PANORAMIC VIDEO IMAGE STABILIZATION

(71) Applicant: Scott Zhihao Chen, Irvine, CA (US)

(72) Inventor: Scott Zhihao Chen, Irvine, CA (US)

( * ) Notice: Subject to any disclaimer, the term of this patent is extended or adjusted under 35 U.S.C. 154(b) by 250 days.

(21) Appl. No.: 15/092,922

(22) Filed: Apr. 7, 2016

(51) Int. Cl.
*H04N 5/232* (2006.01)
*G03B 37/04* (2006.01)
*H04N 13/00* (2018.01)

(52) U.S. Cl.
CPC ......... *H04N 5/23264* (2013.01); *G03B 37/04* (2013.01); *H04N 5/23238* (2013.01); *H04N 5/23251* (2013.01); *H04N 2013/0088* (2013.01)

(58) Field of Classification Search
CPC ....... H04N 2013/0088; H04N 5/23238; H04N 5/3415; H04N 5/23267; H04N 5/23264; H04N 5/23248; H04N 5/23251; H04N 5/23258; G06T 3/4038; G03B 37/04
See application file for complete search history.

(56) References Cited

U.S. PATENT DOCUMENTS

| | | | | |
|---|---|---|---|---|
| 6,788,333 B1 * | 9/2004 | Uyttendaele | ....... | H04N 5/23238 348/36 |
| 7,518,636 B2 * | 4/2009 | Endo | ................... | H04N 5/23238 348/208.99 |
| 7,747,105 B2 * | 6/2010 | Koch | ........................ | G06T 3/60 345/419 |
| 8,957,812 B1 * | 2/2015 | Hill | ........................ | G01S 5/0027 342/445 |
| 9,055,216 B1 * | 6/2015 | Taylor | ................. | H04N 5/23222 |
| 9,417,091 B2 * | 8/2016 | Troni-Peralta | ......... | G01C 25/00 |
| 9,438,800 B1 * | 9/2016 | Kozko | ..................... | G06T 11/00 |
| 9,516,223 B2 * | 12/2016 | Zhou | ..................... | G06T 3/4038 |
| 9,781,349 B2 * | 10/2017 | Desai | ................. | H04N 5/23296 |
| 9,843,724 B1 * | 12/2017 | Brailovskiy | ....... | H04N 5/23238 |
| 2007/0036460 A1 * | 2/2007 | Koch | ........................ | G06T 3/60 382/276 |
| 2010/0141799 A1 * | 6/2010 | Yamashita | ......... | H04N 5/23238 348/239 |
| 2012/0229596 A1 * | 9/2012 | Rose | ..................... | G06T 3/4038 348/36 |
| 2012/0268554 A1 * | 10/2012 | Gilbert-Schachter | ...................... | G03B 37/04 348/36 |
| 2012/0294549 A1 * | 11/2012 | Doepke | ................. | G06T 3/4038 382/294 |
| 2013/0110450 A1 * | 5/2013 | Kulik | ..................... | G01C 17/38 702/141 |

(Continued)

*Primary Examiner* — John Villecco (57) ABSTRACT

Panoramic imaging systems and techniques are disclosed. In one aspect, a technique for generating a stabilized panoramic video image output based on raw image data captured by a panoramic imaging system includes the steps of: receiving raw video images capturing by the panoramic imaging system which is integrated with a set of position sensors; receiving multiple sets of sensor signals acquired by the set of position sensors concurrently when the raw video images are being captured; processing the multiple sets of sensor signals to determine unwanted position changes of the panoramic imaging system when the raw video images are being capturing; and performing an image stabilization operation on the received raw video images to compensate for the effects of the unwanted position changes, thereby generating stabilized panoramic video images based on the raw video images.

23 Claims, 6 Drawing Sheets

(56) References Cited

U.S. PATENT DOCUMENTS

| | | | |
|---|---|---|---|
| 2013/0147908 A1* | 6/2013 | Wei | H04N 5/23238 348/36 |
| 2013/0329072 A1* | 12/2013 | Zhou | G06T 3/4038 348/222.1 |
| 2014/0152655 A1* | 6/2014 | Johnston | G06F 3/011 345/419 |
| 2015/0103183 A1* | 4/2015 | Abbott | G01C 21/165 348/169 |
| 2015/0207988 A1* | 7/2015 | Tracey | H04N 5/23238 348/36 |
| 2015/0304652 A1* | 10/2015 | Spas | G01C 21/165 348/36 |
| 2016/0182822 A1* | 6/2016 | Stankovic | H04N 5/23238 348/36 |
| 2016/0323561 A1* | 11/2016 | Jin | H04N 13/0246 |
| 2017/0003764 A1* | 1/2017 | Li | G06T 19/006 |
| 2017/0085740 A1* | 3/2017 | Lin | G06T 7/20 |
| 2017/0131094 A1* | 5/2017 | Kulik | G01B 21/22 |
| 2017/0142337 A1* | 5/2017 | Kokaram | H04N 5/23238 |
| 2017/0195568 A1* | 7/2017 | Leizerovich, Jr. | H04N 5/23238 |
| 2017/0308116 A1* | 10/2017 | Rondinelli | G06F 1/163 |
| 2017/0350961 A1* | 12/2017 | Hill | G01C 21/165 |
| 2017/0366752 A1* | 12/2017 | Fink | H04N 5/2628 |

* cited by examiner

METHOD AND SYSTEM FOR PANORAMIC VIDEO IMAGE STABILIZATION

TECHNICAL FIELD

The present disclosure generally relates to the field of panoramic imaging, and more specifically to systems and techniques for stabilizing panoramic video images.

BACKGROUND

Panoramic photography, the taking of a photograph or photographs covering an elongated field of view, has a long history in photography. Perhaps the most primitive method of panoramic photography is the taking of several adjoining photos with a conventional camera and then mounting the prints together in alignment to achieve a complete panorama. Modern techniques adapt this method by using digital cameras to capture the images, and then using computer image processing techniques to align the images for printing as a single panorama.

The continuous development of digital camera technologies along with constantly increasing speed and processing power of computers have laid the foundation for digital imaging systems that are capable of acquiring image data for the automatic creation of wide to entire 360° panoramas, including both still panoramic images and dynamic panoramic movies.

When shooting images or movies of outdoor activities, especially when using a hand-held (e.g., a smartphone) or wearable video camera in outdoor situations, the instability of the user can easily cause severe shaking of the camera and thus blurring in the output still or video images and as a result, seriously affecting the viewing experience. Existing techniques and systems provide camera and image stabilization during the image or video capture process, for example, by stabilizing the camera lens using a group of sensors to detect camera shake and a group of motors to move the lens to counter the shake. However, these mechanical stabilization techniques would often take a moment to detect the shake and stabilize the image. In applications where high speeds and high frame rates are needed, the slow speed of the mechanical stabilization operations can severely limit the functionality of the cameras. Moreover, in panoramic imaging systems which use multiple cameras, having multiple sets of motors to independently stabilize multiple cameras can be an extremely expensive approach.

SUMMARY

Described herein are systems and techniques for generating stabilized video images after raw video images having been captured and during the video playback. In some embodiments, the described system uses a plurality of position sensors integrated with the camera system to detect the camera system's instantaneous positions and position changes during the time period when the video images are being capturing, and uses programs to perform real-time shifting and/or rotational compensation for the output video images to remove image shake and sway caused by the unstable camera system, thereby obtaining stabilized video images.

In one aspect, a process of generating a stabilized panoramic video image output based on raw image data captured by a panoramic imaging system is disclosed. This process includes receiving raw video images capturing by the panoramic imaging system which is integrated with a set of position sensors; receiving multiple sets of sensor signals acquired by the set of position sensors concurrently when the raw video images are being captured; processing the multiple sets of sensor signals to determine unwanted position changes of the panoramic imaging system when the raw video images are being capturing; and performing an image stabilization operation on the received raw video images to compensate for the effects of the unwanted position changes, thereby generating stabilized panoramic video images based on the raw video images.

In some embodiments, the set of position sensors includes an accelerometer sensor, a gyroscope sensor, and a magnetometer sensor, and each of the accelerometer sensor, the gyroscope sensor, and the magnetometer sensor generates 3-axis of position signals.

In some embodiments, processing the multiple sets of sensor signals to determine the unwanted position changes of the panoramic imaging system includes the steps of: filtering the multiple sets of sensor signals to remove sensor noises from the received sensor signals; determining instantaneous positions of the panoramic imaging system from the filtered sensor signals; and determining the unwanted position changes of the panoramic imaging system based on the determined instantaneous positions of the panoramic imaging system.

In some embodiments, performing the image stabilization operation on the received raw video images to compensate for the effects of the unwanted position changes includes the steps of: feeding the received raw video images and the determined unwanted position changes into an equirectangular projection program; mapping, using the equirectangular projection program, each of the received raw video images from a two-dimension (2D) image to a spherical three-dimension (3D) image; compensating for the effects of the unwanted position changes by shifting and/or rotating the mapped spherical 3D images in an opposite direction to but by substantially the same amount as the determined unwanted position changes of the panoramic imaging system; and generating stabilized panoramic video images using the compensated spherical 3D images.

In some embodiments, shifting and/or rotating the mapped spherical 3D images to compensate for the effects of the unwanted position changes does not cause clipping artifact in the stabilized panoramic video images or reduce the field of view of the stabilized panoramic video images.

In another aspect, a panoramic imaging system is disclosed. This system includes a plurality of cameras having a field of view that overlaps with the field of view of at least one other camera among the plurality of cameras; a set of position sensors configured to measure positions of the panoramic image system; a controller configured to command each of the plurality of cameras to acquire raw video images and each of the set of position sensors to acquire a set of sensor signals. The controller further includes a processor coupled to a memory. The processor is configured to execute an image stabilization program stored in the memory which includes the steps of: receiving raw video images capturing by the plurality of cameras; receiving multiple sets of sensor signals acquired by the set of position sensors concurrently when the raw video images are being captured; processing the multiple sets of sensor signals to determine unwanted position changes of the panoramic imaging system when the raw video images are being capturing; and performing an image stabilization operation on the received raw video images to compensate for the effects of the unwanted position changes, thereby generating stabilized panoramic video images based on the raw video images.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Described herein are systems and techniques for generating stabilized video images after a video having been captured and during the video playback. In some embodiments, the described system uses a plurality of position sensors integrated with a camera system to detect the camera system's instantaneous positions during the time period when the video images are being capturing, and uses programs to perform real-time shifting and/or rotational compensation for the output video images to remove image shake and sway caused by the unstable camera system body, thereby obtaining stabilized video images.

In some embodiments, the target video images are 360°× 180° full spherical images captured by a panoramic imaging system and the output of the described system is stabilized panoramic video images. Notably, because the video images are recorded as panoramic 360° full spherical images, the shifting and/or rotational compensation of the output video images does not affect the field-of-view of the output video images.

One aspect of the disclosed technology is a highly efficient process and technique for stabilizing captured video images based on multiple sets of sensor data acquired by a set of position sensors integrated with the camera system. In some embodiments, the plurality of sensors includes a 9-axis inertial motion sensor, such as a 9-axis microelectromechanical system (MEMS) sensor.

In some embodiments, the set of integrated position sensors includes an accelerometer sensor (or gravity sensor), a gyroscope sensor, and a magnetometer sensor. In these embodiments, each of the sensors is capable of generating 3-axis outputs in the x, y, and z directions and therefore the set of position sensors generates a combined 9-axis positional outputs. For example, an accelerometer sensor generates outputs of linear accelerations in the x, y, and z directions; a gyroscope sensor generates outputs of rotational velocity with respect to the x, y, and z directions; and a magnetometer sensor generates outputs of positions relative to the earth center in the x, y, and z directions. In combination, the above three sensors generate 9-axis sensor outputs of the camera system's various states of movement during the video capturing process. The disclosed technique and system also include a program which takes the 9-axis sensor outputs as inputs to compute instantaneous three-dimensional (3D) positions and position changes of the camera body, and uses the computed positional information to dynamically adjust video projection angle in real-time during the playback of the video signals.

In some specific implementations, prior to using the sensor signals to compute camera system's orientations and positions, the system performs a filtering operation on the sets of sensor signals to eliminate sensor noises. In some embodiments, the redundant positional information in the 9-axis sensor outputs is used to remove false shaking signals. After filtering and removing false signals from the acquired sensor signals, the 9-axis sensor outputs can be used to compute accurate instantaneous positions of the camera system.

In some implementations, the computed instantaneous positions and position changes of the camera body are fed into an equirectangular projection module. This equirectangular projection module includes a sub-module configured to remove the effects of the unwanted position changes in the raw video signals based on the computed instantaneous positions and position changes of the camera body and generate stabilized shake-free panoramic video images.

Figure 1:
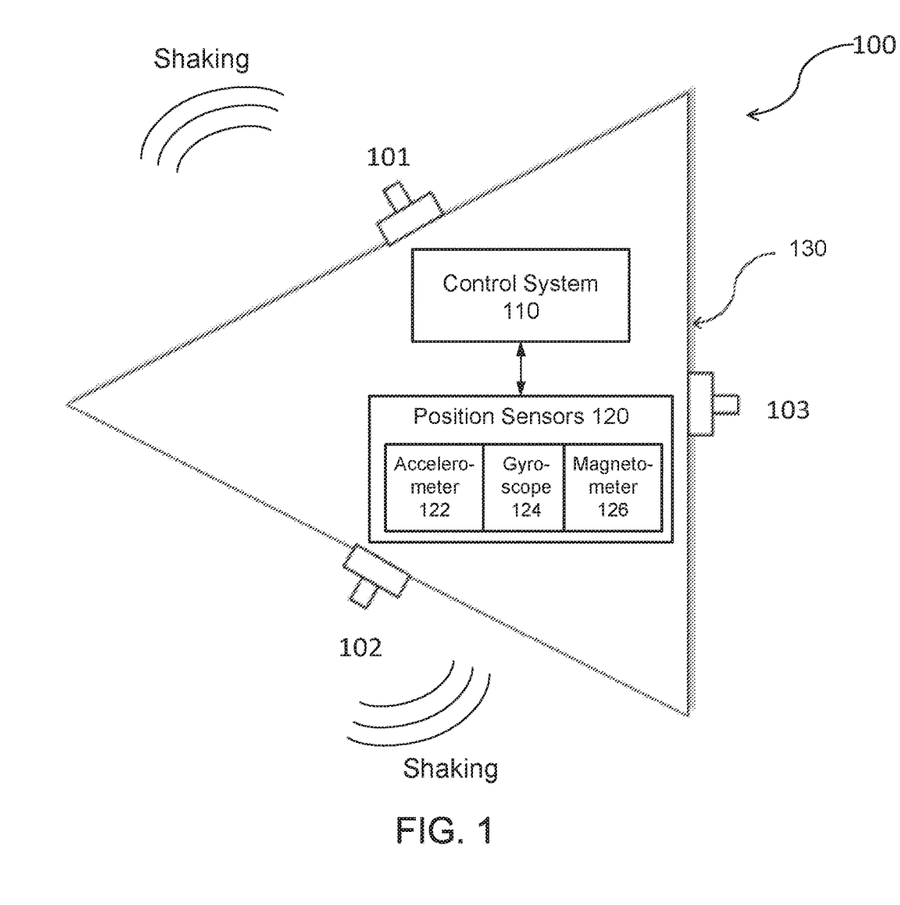
FIG. 1 is a schematic top view of an example panoramic imaging system according to some embodiments of the present disclosure.

FIG. 1 is a schematic top view of an example panoramic imaging system 100 according to certain aspects of the disclosure. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 1, panoramic imaging system 100 of FIG. 1 includes cameras 101, 102, 103, a control system 110, a set of position sensors 120, and a housing 130. Each of cameras 101, 102 and 103 may be a digital camera. In some aspects, each of cameras 101, 102 and 103 may include a wide-angle lens (e.g., fisheye lens) to capture image data. The horizontal angle of view of a wide-angle lens may be greater than 180 degrees and the vertical angle of view of a wide-angle lens may be greater than 180 degrees. FIG. 1 shows cameras 101, 102 and 103 are distributed evenly across on a frame of housing 130, for example, on three vertices of the frame with a triangle shape. Each of cameras 101, 102 and 103 may face a ⅓ of a 360° field. It can be appreciated that cameras 101, 102 and 103 may be distributed in any other arrangement and each of cameras 101, 102 and 103 may face any portion of a 360° field.

As mentioned above, when panoramic imaging system 100) is used to shoot videos of outdoor activities, especially when panoramic imaging system 100 is used in a hand-held manner or as a wearable video camera in outdoor situations, the instability of the camera body can cause severe shaking or blurring in the output video images of individual cameras 101, 102, 103 and as a result, causing blurring and ghosting in the composite panoramic images generated from individual images of cameras 101, 102, 103. The set of position sensors 120 are integrated with cameras 101, 102, 103 to facilitate detecting shaking and jittering of panoramic imaging system 100 during a video capturing process.

The set of position sensors 120 may include an accelerometer sensor (or "accelerometer" hereinafter) 122, a gyroscope sensor (or "gyroscope" hereinafter) 124, and a magnetometer sensor (or "magnetometer" hereinafter) 126. In some embodiments, each of the three sensors 122-126 is capable of generating 3-axis outputs relative to the x, y, and z directions. For example, an accelerometer generates outputs of linear accelerations of panoramic imaging system 100 in the x, y, and z directions; a gyroscope generates outputs of rotational velocities of panoramic imaging system 100 with respect to the x, y, and z directions; and a magnetometer generates outputs of panoramic imaging system 100's positions relative to the center of the earth in the x, y, and z directions. In combination, the above three sensors generate nine axes of outputs representative of the panoramic imaging system 100's various states of movements, which can be used to determine instantaneous angular positions (i.e., orientations) and linear positions of the panoramic imaging system 100 during a video signal capturing process. In some embodiments, each of the above sensors can be implemented as a microelectromechanical system (MEMS) sensor. In some embodiments, the three MEMS sensors are isolated sensors. In other embodiments, the set of position sensors 120 can be implemented as an integrated MEMS sensor module.

In some embodiments, the set of position sensors 120 may include a greater or few numbers of sensors, or a different set of three sensors. For example, the set of position sensors 120 may include an accelerometer and a gyroscope sensor without a magnetometer. As another example, the set of position sensors 120 may include a gravity sensor instead of an accelerometer, a gyroscope, and a magnetometer. Some other embodiments may use an accelerometer and a magnetometer without a magnetometer. Notably, it is possible to use just one or two of the three position sensors to determine the angular and linear positions of panoramic imaging system 100. However, using all three position sensors can obtain redundant positional data. As a result, the system can use the redundant positional data to cross-calibrate positional data among multiple sensors, thereby generating more accurate and reliable positions of panoramic imaging system 100.

As can be seen in FIG. 1, the set of position sensors 120 and the control system 110 are coupled through a bi-directional interface. Hence, in additional to transmitting the acquired sensor signals from the set of position sensors 120 and control system 110, the operations of the set of position sensors 120 may be controlled by control system 110 by receiving instructions and commands from control system 110 through the interface.

Control system 110 may include one or more electronic circuitries, such as a system on chip (SOC) with a field-programmable gate array (FPGA), Accelerated Processing Unit (APU) and peripheral electronic circuitries, for processing the image data captured by cameras 101, 102, and 103 to produce wide to entire 360° panoramas, including both still images and movies. It can be appreciated that outputs of panoramic imaging system 100 may be panoramas stitched from a set of original images captured by cameras 101, 102, and 103.

Control system 110 may include programs which take sensor signals acquired by the set of position sensors 120 as inputs and process the sensor signals to compute instantaneous three-dimensional (3D) positions and postures of panoramic imaging system 100. Control system 110 may also include programs configured to use the computed positional parameters to generate stabilized panoramic video images free of undesirable effects from shaking and other unwanted motions of panoramic imaging system 100. In particular, the above-mentioned position determination program and the equirectangular projection program may be executed concurrently and in real-time when the raw video data are being captured so that the raw video data and the computed positional parameters can be used to generate shake-free panoramic video images which is subsequently stored/streamed/uploaded in place of the raw video data.

In some aspects, the above mentioned programs for real-time position determination and equirectangular projection may be implemented on one or more electronic circuitries, such as a system on chip (SOC) with a field-programmable gate array (FPGA). FPGA may include a hardware (e.g., ASIC) module that integrates different functions, including for example, functions associated with Random-Access Memory (RAM) and clock management. A hardware implementation scheme may be selected depending on the applications of the present disclosure.

Cameras 101, 102, 103 and control system 110 may be enclosed in housing 130, such as a protective housing to reduce environmental effects on the components. In some embodiments, the protective housing is waterproof, dust-proof, shockproof, freeze-proof, or any combination thereof. In some aspects, housing 130 may include one or more mechanical parts for mounting, housing and/or moving the cameras 101, 102 and 103, the set of position sensors 120 and/or other optical components. Further, in some embodiments, cameras 101, 102, 103 and the set of position sensors 120 can be reversibly coupled to or detached from the remaining system, such that an end user may select different models of cameras 101, 102, 103 and the set of position sensors 120 to be used with panoramic imaging system 100 according to particular needs or preferences.

A person having ordinary skills in the art would appreciate that a variety of embodiments of cameras 101, 102, 103 may be employed. These embodiments may have different numbers and/or arrangements of cameras 101, 102, 103, but a common feature may be that each camera's field of view overlaps with that of at least one other camera, thereby enabling panoramic imaging system 100 to capture a total field of view according to the design. Those of ordinary skills in the art upon reading the present disclosure should become aware of how a panoramic imaging system according to the present disclosure can be designed to satisfy particular needs. Particularly, skilled persons in the art would follow the guidance provided by the present disclosure to select a suitable number of cameras with reasonable fields of view and arrange the set of cameras such that neighboring cameras' fields of view have reasonable overlap that enables the system to cover a desirable total field and reliably process image information in the overlapping field to produce panoramas.

While the embodiment of FIG. 1 shows that the control system 110 being located internally within housing 130, other embodiments of panoramic imaging system 100 can having control system 110 separated from the optical system (i.e., cameras 101, 102, 103, the set of position sensors 120 and housing 130) to allow users' selection of different models of cameras 101, 102, 103 and the set of position sensors 120 to be used with the control system 110 without departing from the scope of the present inventive concept.

Figure 2:
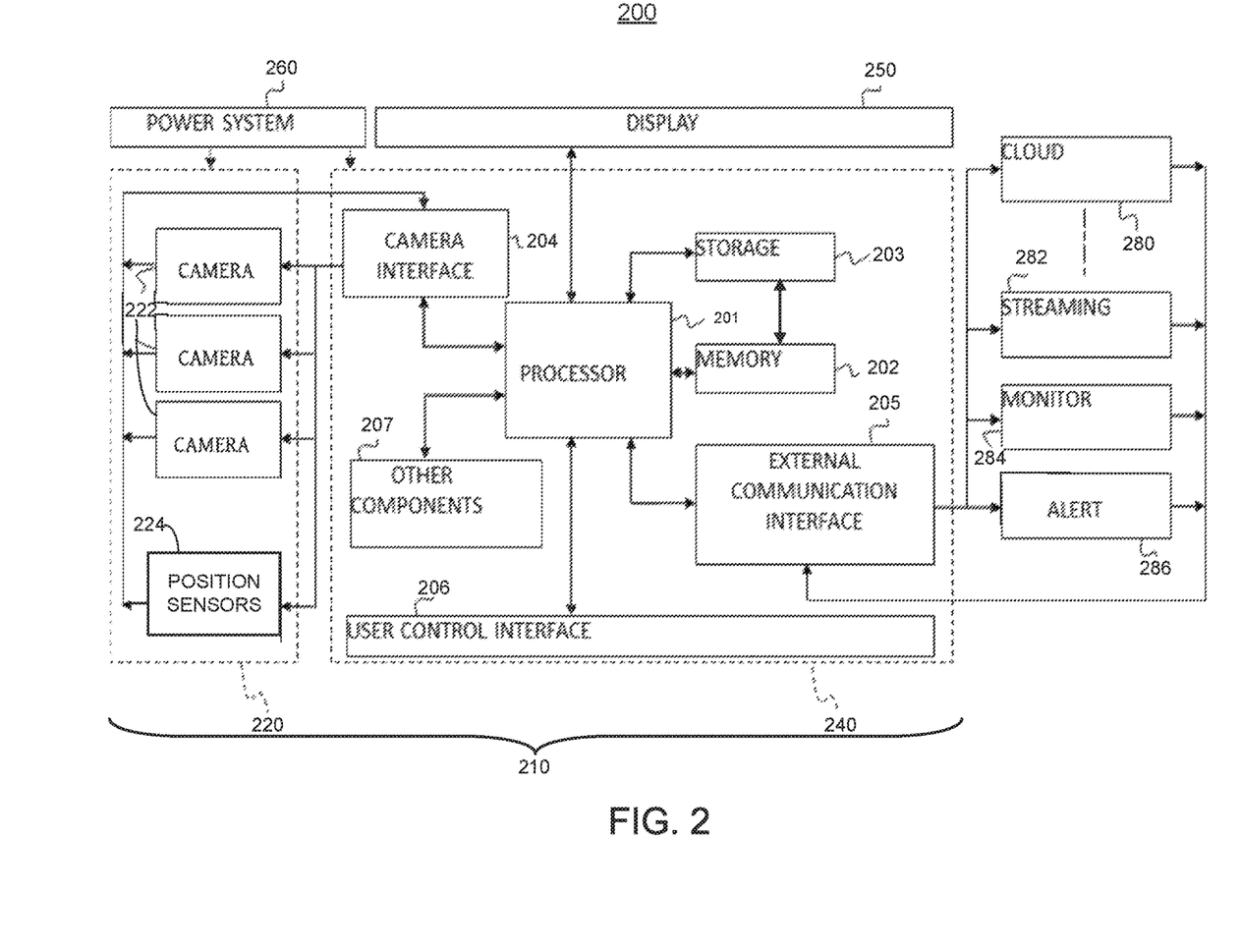
FIG. 2 conceptually illustrates an exemplary electronic system including a panoramic imaging system and various peripheral modules configured in an internet-enabled application environment with which some implementations of the subject technology can be implemented.

FIG. 2 conceptually illustrates an exemplary electronic system 200 including a panoramic imaging system 210 and various peripheral modules configured in an internet-enabled application environment with which some implementations of the subject technology can be implemented. Not all of the depicted components may be used, however, and one or more implementations may include additional components not shown in the figure. Variations in the arrangement and type of the components may be made without departing from the scope of the subject technology. Additional components, different components, or fewer components may be provided.

Exemplary panoramic imaging system 210 within exemplary panoramic imaging electronic system 200 may be implemented by panoramic imaging system 100 as described above with reference to FIG. 1. According to the present disclosure, the example panoramic imaging system 210 further includes an optical system 220 which includes a plurality of cameras 222 and a set of position sensors 224, and a control system 240 that controls the functions of the optical system 220 and includes at least an image processing program to process data and signals output from optical system 220 including sensor signals from the set of position sensors 224. The plurality of cameras 222 may be implemented by cameras 101-103 in system 100. The set of position sensors 224 may be implemented by the set of position sensors 120 in system 100. As mentioned above in conjunction with FIG. 1, the set of position sensors 224 can include an accelerometer, a gyroscope, and a magnetometer to generate a combined 9-axis positional signals of panoramic imaging system 210 as functions of time.

Control system 240 described in FIG. 2 may be used to implement control system 110 described in FIG. 1. Particularly, the control system 240 includes at least a processor 241, a memory 242, a storage device 243, a camera interface 244, an external communication interface 245, and a user control interface 246. The control system 240 can be a general-purpose computer system such as a Personal Computer (PC), or preferably a custom-designed computing system. Particularly in some embodiments, the control system 240 is a system on chip (SOC); that is, an integrated circuit (IC) integrates all components and functions of the control system 240 into a single chip, which makes the present panoramic imaging system 210 portable and electronically durable as a mobile device. In some embodiments, the control system 240 may be located internally within a same housing where the optical system 220 is located. Alternatively, in other embodiments, the control system 240 is separated from the optical system 220 to allow end users' selection of different models of an optical system 220 to be used with the control system 240.

The storage device 203 is preloaded with at least the position determination and image processing programs of the present disclosure. Other customer-designed software programs may be preloaded during manufacture or downloaded by end users after they purchase the system. Exemplary customer-designed software programs to be used with the present panoramic imaging system include but are not limited to software that further processes panoramic images or videos according to an end user's needs, such as 3D modeling, object tracking, and virtual reality programs. Further exemplary customer-designed software includes but is not limited to image editing programs that allow users to adjust color, illumination, contrast or other effects in a panoramic image, or film editing programs that allow users to select favorite views from a panoramic video to make normal videos.

The electronic circuitry in the processor 201 carries out instructions of the various algorithms. Thus, the various software programs, stored on the storage device 203 and executed in the memory 202 by the processor 201, direct the control system 240 to act in concert with the optical system 220 to perform various functions, which include but are not limited to receiving commands from an end user or an external device or service 280, 282, 284 and 286, defining the precise geometry of the cameras 222, commanding the cameras 222 to capture raw image data and acquire positional signals, tagging and storing raw data and sensor signals in a local storage device 203 and/or commuting raw data and sensor signals to an external device or service 280, 282, 284 and 286, processing raw video data and position sensor signals to compute angular and linear positions of optical system 220 and subsequently generate adjusted and stabilized panoramic videos to account for the shaking and other motion disturbances of optical system 220, presenting generated stabilized panoramas on a local display 250 and/or communicating generated stabilized panoramas to be stored or presented on an external device or service 280, 282, 284 and 286.

The processor 201 of the present disclosure can be any integrated circuit (IC) that is designed to execute instructions by performing arithmetic, logical, control and input-output (I/O) operations specified by algorithms. Particularly, the processor can be a central processing unit (CPU) and preferably a microprocessor that is contained on a single IC chip. In some embodiments, the control system 240 may employ a multi-core processor that has two or more CPUs or array processors that have multiple processors operating in parallel. In some embodiments, the processor 201 is an application specific integrated circuit (ASIC) that is designed for a particular use rather than for general purpose use. Particularly, in some embodiments, the processor 201 is a digital signal processor (DSP) designed for digital signal processing. More particularly, in some embodiments, the processor 201 is an on-chip image processor, specialized for image processing in a portable camera system. In some embodiments, the control system 240 includes a graphic processing unit (GPU), which has a massively parallel architecture consisting of thousands of smaller, more efficient cores designed for handling multiple tasks simultaneously. Particularly, in some embodiments, the control system 240 may implement GPU-accelerated computing, which offloads compute-intensive portions of an algorithm to the GPU while keeping the remainder of the algorithm to run on the CPU.

The memory 202 and the storage 203 of the present disclosure can be any type of primary or secondary memory device compatible with the industry standard, such as read-only memory (ROM), random access memory (RAM), electrically erasable programmable read-only memory (EEPROM), and flash memory. In the embodiments where the control system 240 is a single chip system, the memory 202 and storage 203 blocks are also integrated on-chip with the processor 201 as well as other peripherals and interfaces. In some embodiments, the on-chip memory components may be extended by having one or more external solid-state storage media, such a secure digital (SD) memory card or a USB flash drive, reversibly connected to the imaging system. For example, the various memory units include instructions for removing an obstructing object in a panoramic image. From these various memory units, the processor 201 retrieves instructions to execute and data to process in order to execute the processes of some implementations.

The camera interface 204 of the present disclosure can be any form of command and data interface usable with a camera 222, such as a digital. The camera interface 204 of the present disclosure can also be any form of command and data interface to communicate with position sensors 224. Exemplary embodiments include USB, FireWire and any other interface for command and data transfer that may be commercially available. Additionally, it is preferred, although not required, that the optical system 220 be equipped with a single digital control line that would allow a single digital signal to command all the cameras 222 and sensors 224 simultaneously to capture an image of a scene and to acquire positional signals of the camera body.

The external communication interface 205 of the present disclosure can be any data communication interface, and may employ a wired, fiber-optic, wireless, or another method for connection with an external device or service 280, 282, 284 and 286. Ethernet, wireless-Ethernet, Bluetooth, USB, FireWire, USART, SPI are exemplary industry standards. In some embodiments, where the control system 240 is a single chip system, the external communication interface 205 is integrated on-chip with the processor 201 as well as other peripherals and interfaces.

The user control interface 206 of the present disclosure can be any design or mode that allows effective control and operation of the panoramic imaging system from the user end, while the system feeds back information that aids the user's decision making process. Exemplary embodiments include but are not limited to graphical user interfaces that allow users to operate the system through direct manipulation of graphical icons and visual indicators on a control panel or a screen, touchscreens that accept users' input by touch of fingers or a stylus, voice interfaces which accept users' input as verbal commands and outputs via generating voice prompts, gestural control, or a combination of the aforementioned modes of interface.

Control system 240 of the present disclosure may further include other components 207 that facilitate its function. For example, control system 240 may optionally include a location and orientation sensor that could determine the location and orientation of the panoramic imaging system. Exemplary embodiments include a global positioning system (GPS) that can be used to record geographic positions where image data are taken, and a digital magnetic compass system that can determine the orientation of camera system in relation to the magnetic north. Control system 240 may optionally be equipped with a timing source, such as an oscillator or a phase-locked loop, which can be used to schedule automatic image capture, to time stamp image data, and to synchronize actions of multiple cameras to capture near simultaneous images in order to reduce error in image processing. Control system 240 may optionally be equipped with a light sensor for environmental light conditions, so that control system 240 can automatically adjust hardware and/or software parameters of the system.

In some embodiments, the present electronic system 200 is further equipped with an internal power system 260 such as a battery or solar panel that supplies the electrical power. In other embodiments, electronic system 200 is supported by an external power source. In some embodiments, electronic system 200 is further equipped with a display 250, such that panoramic photos may be presented to a user instantly after image capture, and panoramic videos may be displayed to a user in real time as the scenes are being filmed.

In some embodiments, the present electronic system 200 may be used in conjunction with an external device for displaying and/or editing panoramas generated. Particularly, the external device can be any electronic device with a display and loaded with software or applications for displaying and editing panoramic images and videos created by the present system. In some embodiments, the external device can be smart phones, tablets, laptops or other devices programmed to receive, display, edit and/or transfer the panoramic images and videos. In some embodiments, the present panoramic imaging system may be used in conjunction with an external service, such as Cloud computing and storage 280, online video streaming and file sharing 282, remote surveillance 284, and alert 286 for home and public security.

Figure 3:
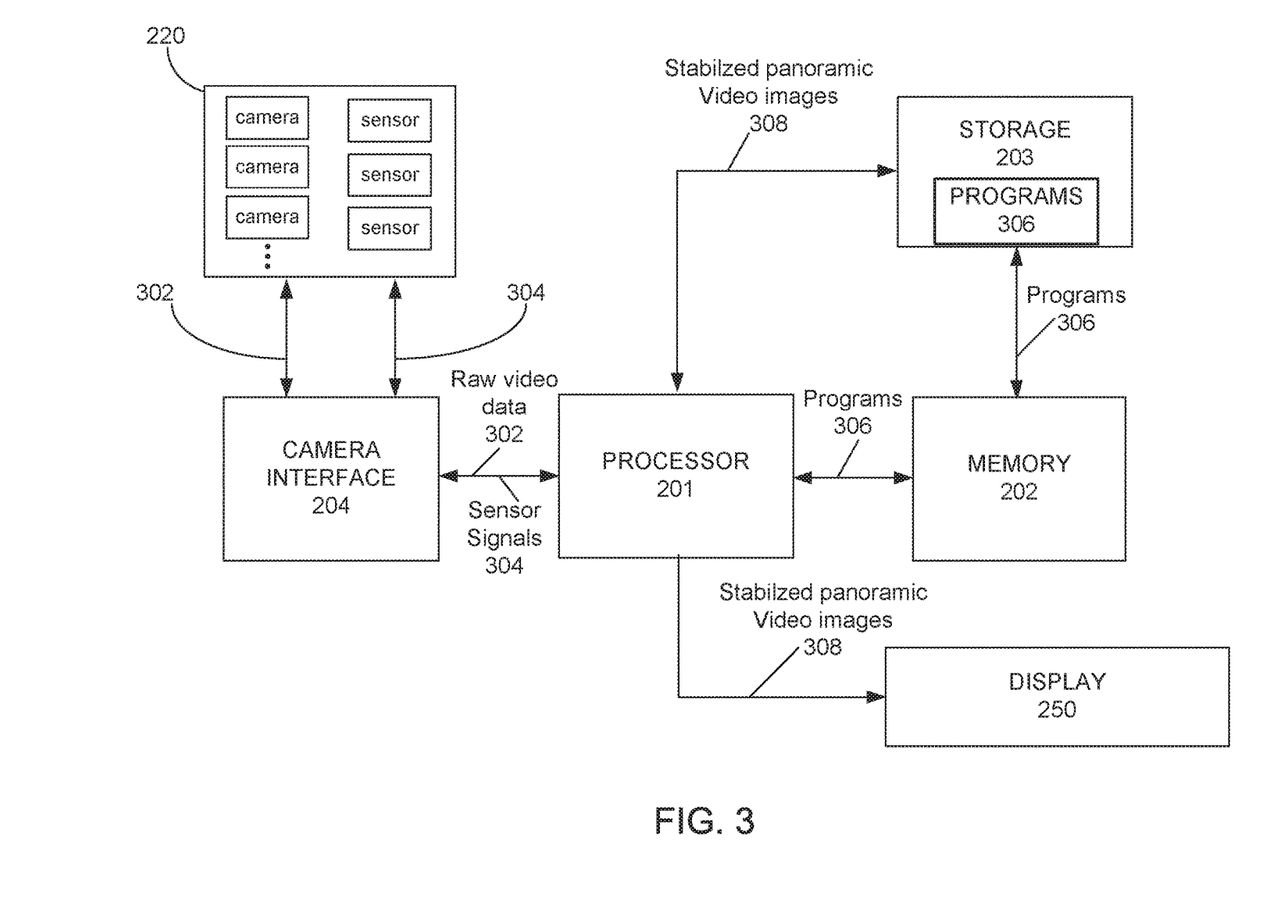
FIG. 3 illustrates hardware modules and data flow within the control system of FIG. 2 for processing raw video data and sensor signals received from the panoramic imaging system to generate stabilized panoramic video images which compensates for the shaking and other motion disturbances of the panoramic imaging system according to some embodiments of the present disclosure.

FIG. 3 illustrates hardware modules and data flow within control system 240 for processing raw video data and sensor signals received from optical system 220 to generate stabilized panoramic video images which compensates for the shaking and other motion disturbances of optical system 220 according to some embodiments of the present disclosure. As can be seen in FIG. 3, storage 203 in control system 240 stores a set of image and signal processing programs 306 according to various embodiments of the present disclosure to process data and signals received from optical system 220 including raw video data from the set of cameras and sensor signals from the set of position sensors. Image and signal processing programs 306 can be configured to achieve some or all of the following functions: filtering the sensor signals; cross-calibrating redundant positional data acquired by the multiple position sensors; computing accurate angular and linear positions of optical system 220 based on the sensor signals; using the raw video data and the computed angular and linear positional parameters to generate panoramic video images, including 360°×180° full-spherical panoramic images which have been corrected for the shaking and other unwanted motions of the optical system 220; and outputting stabilized panoramic video images.

In some aspects of the present disclosure, programs 306 include an equirectangular projection program which performs the mapping of pixels from a 2D flat image to a 3D panoramic image. In some embodiments, the mapping process may locate the positions before and after the mapping by performing calculations using a trigonometric function. The calculations using a trigonometric function may include, for example, x=f*tan(x'/s); y=f*tan(y'/s)/cos(x'/s), where (x, y) is the original coordinates of a pixel, (x', y') is the destination coordinates of a pixel, s is the radius of a sphere, f is a focal length of a camera. Furthermore, the equirectangular projection program of the present disclosure includes an anti-shaking sub-module which operates to remove the effects of shaking and other unwanted motions of the optical system 220 from the generated panoramic video images.

In some embodiments, the described panoramic video data correction and projection process is performed in real-time when the panoramic video data is being captured. Again referring to FIG. 3, during a video capturing process, processor 201 concurrently receives raw video data 302 being captured on the set of cameras and sensor signals 304 being acquired by the set of position sensors from optical system 220 through camera interface 204. At the same time, processor 201 receives instructions from programs 306 loaded into memory 202 and executes the instructions to process received raw video data 302 and sensor signals 304 in real-time to perform some or all of the of the following operations: filtering the sensor signals 304; cross-calibrating redundant positional data acquired by the multiple position sensors; computing accurate angular and linear positions of optical system 220 based on the sensor signals 304; and using the received the raw video data 302 and the computed positional parameters to generate stabilized panoramic video images 308 which include compensations for shaking and other unwanted movements in the angular and linear positions of the optical system 220; and outputting stabilized panoramic video images 308 onto display 250 and/or to storage 203 for storage.

Figure 4A:
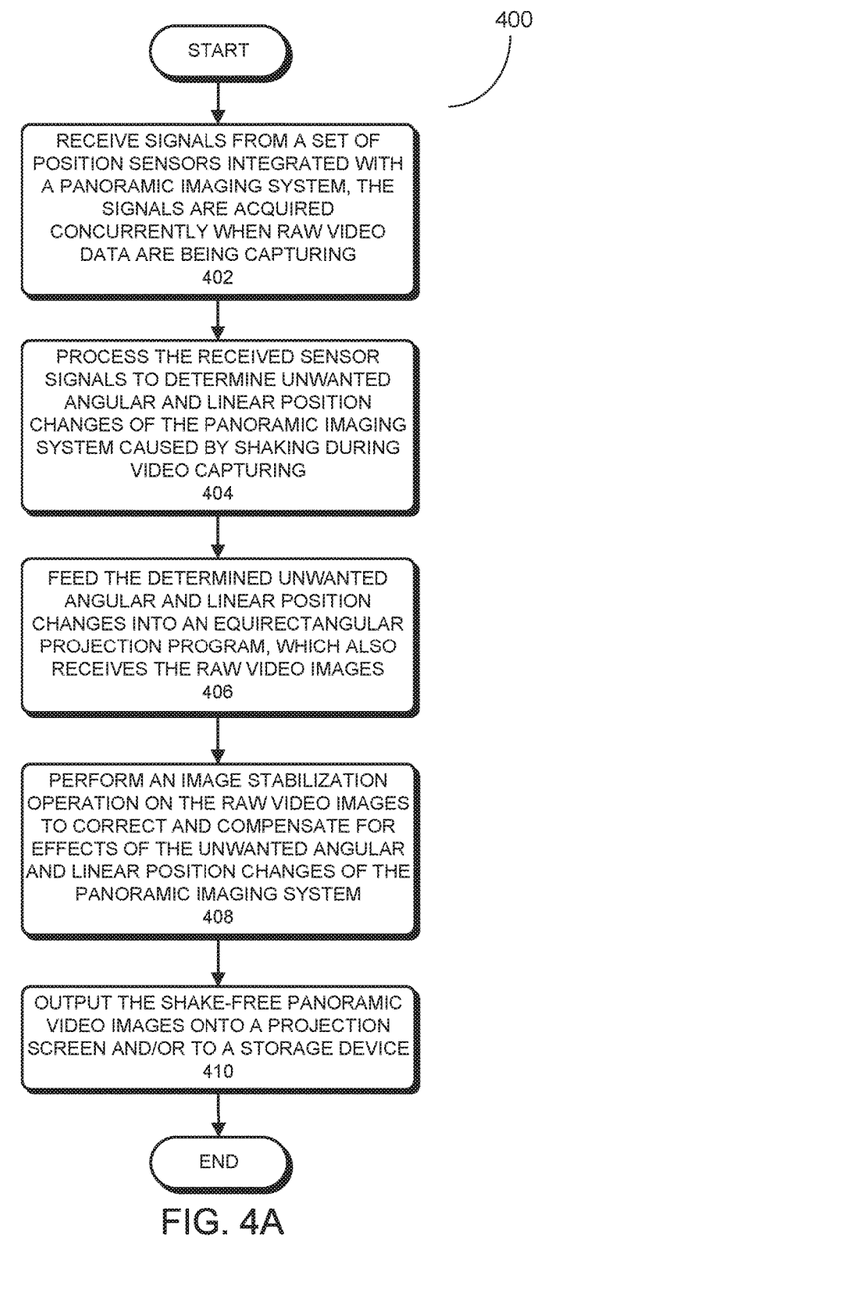
FIG. 4A presents a flowchart illustrating an exemplary process of removing effects of shaking and other unwanted movements of a panoramic imaging system from captured video images according to some embodiments of the present disclosure.

FIG. 4A presents a flowchart illustrating an exemplary process 400 of removing effects of shaking and other unwanted movements of a panoramic imaging system from captured video images according to some embodiments of the present disclosure. For explanatory purposes, the exemplary process 400 is primarily described herein with reference to panoramic imaging system 100 in FIG. 1 and panoramic imaging system 210 in FIG. 2. However, exemplary process 400 is not limited to panoramic imaging systems 100 and 210, and exemplary process 400 may be performed by one or more components of panoramic imaging system 100 in FIG. 1 and one or more components of panoramic imaging system 210 in FIG. 2. Furthermore, the steps of exemplary process 400 are described herein as occurring in serial, or linearly. However, multiple steps of exemplary process 400 may occur in parallel. In addition, the steps of example exemplary 400 may be performed in a different order than the order shown and/or one or more of the steps of exemplary process 400 may be omitted in some embodiments.

The process 400 begins with receiving multiple sets of sensor signals from a set of position sensors integrated with a panoramic imaging system, wherein the sensor signals are acquired concurrently when raw video data are being capturing by the panoramic imaging system (step 402). In some embodiments, the set of position sensors includes an accelerometer, a gyroscope, and a magnetometer and each of the three sensors generates 3-axis of time-varying outputs of the panoramic imaging system's positions, which further include both angular and linear positions. In combination, the set of three sensors generates 9-axis of outputs representative of the panoramic imaging system's various states of movements during the video data capturing process, which can be used to determine instantaneous angular and linear positions of the panoramic imaging system during the video data capturing process. In some embodiments, the set of sensors are implemented as MEMS sensors, which can be either implemented as isolated MEMS sensors or as an integrated MEMS sensor module.

Next, the received sensor signals are processed by the control system of the panoramic imaging system to determine unwanted angular and linear position changes of the panoramic imaging system caused by shaking and other unwanted movements of the panoramic imaging system during the video capturing process (step 404). In some cases, shaking of the panoramic imaging system causes only linear displacements to the panoramic imaging system, for example, when the camera lens rocks up and down, left and right, or back and forth about a fixed location. In such cases, outputs of step 404 include linear components, which may be represented by either three Cartesian coordinates. In some cases, shaking of the panoramic imaging system causes only orientation changes to the panoramic imaging system, for example, when the camera lens sways around a fixed direction. In such cases, outputs of step 404 include only angular components, which may be represented by either spatial angles $(\theta, \varphi)$ or Euler angles $(\alpha, \beta, \gamma)$. In some embodiments, step 404 is performed in a conventional hardware and software implementation scheme using a processor which executes software programs stored in a storage device within the control system as described in conjunction with FIGS. 2 and 3. In other embodiments, step 404 is performed in a hardware implementation scheme using a FPGA module within the control system that is configured to perform the specific functions of step 404.

Figure 4B:
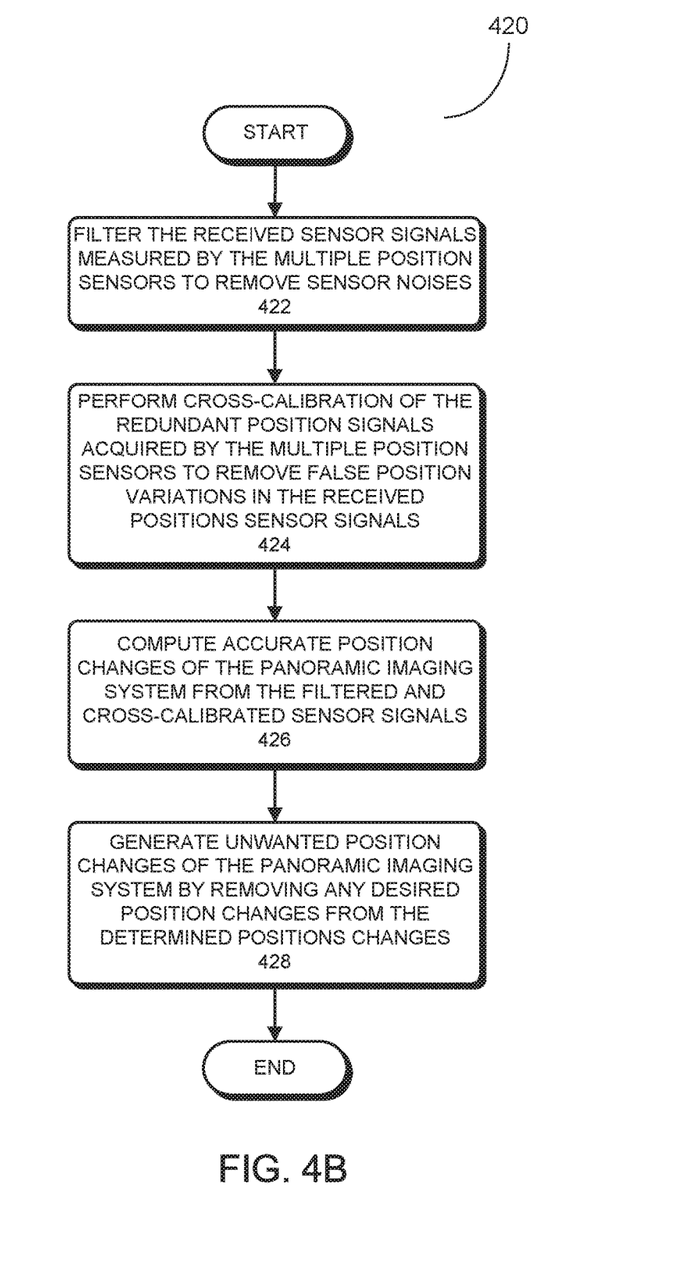
FIG. 4B presents a flowchart illustrating an exemplary process of determining unwanted angular and linear position changes of the panoramic imaging system based on the received position sensor signals according to some embodiments of the present disclosure.

FIG. 4B presents a flowchart illustrating an exemplary process 420 for determining unwanted angular and linear position changes of the panoramic imaging system based on the received position sensor signals (i.e., step 404) according to some embodiments of the present disclosure. More specifically, the exemplary process 420 begins by filtering the received sensor signals measured by the multiple position sensors to remove sensor noises (step 422). In some embodiments, filtering the received sensor signals involves using a Kalman filter to filter out sensor noises from the received sensor signals. However, other types of filtering techniques may also be used to remove sensor noises from the received position sensor signals.

The exemplary process 420 next performs cross-calibration of the redundant position signals acquired by the multiple position sensors to remove false position variations in the received positions sensor signals (step 424). For example, it may be sufficient to use only the accelerometer and the gyroscope to determine all angular and linear positions of the panoramic imaging system. However, the 6-axis of position signals from the accelerometer and the gyroscope are unique and may contain false position information due to various reasons such as defects in the sensors. By using the additional position signals obtained by the magnetometer to complement the position signals from the accelerometer and the gyroscope, the false position information can be removed.

The exemplary process 420 then computes accurate position changes of the panoramic imaging system from the filtered and cross-calibrated sensor signals (step 426). Finally, the exemplary process 420 generates unwanted position changes of the panoramic imaging system, such as shaking, by removing desired position changes of the panoramic imaging system from the determined position changes of the panoramic imaging system, if there is any (step 428). For example, the desired position changes may include predetermined motions of the panoramic imaging system during raw video data capturing. In some embodiments, one or more of the steps 422-426 are optional.

Returning to FIG. 4A of the exemplary process of 400, after step 404, the process feeds the determined unwanted angular and linear position changes of panoramic imaging system into a modified equirectangular projection program, which also receives as input the raw video data captured by the panoramic imaging system (step 406). Note that, without making correction to the raw video data, camera movements can cause the generated panoramic images from the raw video data to be blurry. Hence, in the exemplary process 400, the modified equirectangular projection program performs an image stabilization operation on the raw video images to correct and compensate for the effects of the unwanted angular and linear position changes of the panoramic imaging system, thereby generating stabilized shake-free panoramic video images (step 408). Notably, the anti-shaking image stabilization operation 408 may be performed on video images output from the multiple cameras prior to merging/stitching the individual video images to form panoramic images. Alternatively, the anti-shaking image stabilization operation 408 may be performed on the composite panoramic images after merging/stitching the individual video images captured by the multiple cameras. Finally, the stabilized shake-free panoramic video images are displayed on a projection screen and/or output to a storage device (step 410).

As mentioned above, a panoramic camera system employs multiple cameras (e.g., 3, 4, 6, and 8 cameras) and their respective captured images are subsequently merged/stitched together to achieve a single panorama display, and to enable 360°×180° full-spherical panoramic images. Moreover, an equirectangular projection program performs the mapping of pixels from flat (2D) images captured by the multiple cameras to a single 3D panoramic image through stitching. A modified equirectangular projection program according to some embodiments of the present disclosure includes an additional image stabilization process which compensates for the detected movements of the panoramic imaging system that cause blurry still images or shaky video images. As mentioned above, the anti-shaking image stabilization operation may be performed on individual video images captured by the multiple cameras prior to merging/stitching the individual video images to form panoramic images, or it may be performed on the composite panoramic images after merging/stitching the individual raw video images captured by the multiple cameras.

More specifically, if the anti-shaking image stabilization process is applied to individual video images prior to the merging/stitching, then each of the individual video images, after be mapped from a flat image to a spherical image, may be shifted and/or rotated by substantially the same amount but in the opposite direction to the determined unwanted movements of the panoramic imaging system. For example, if the determined angular and linear position changes in step 404 include a 3-degree upward sway, the image stabilization process of the modified equirectangular projection program in step 408 compensates for this angular change by rotating each of the mapped video images 3-degree downward.

On the other hand, if the anti-shaking image stabilization process is applied to the panoramic images after the merging/stitching, then the panoramic images may be shifted and/or rotated by substantially the same amount but in the opposite direction to the determined unwanted movements of the panoramic imaging system. For example, if the determined angular and linear position changes in step 404 include a 3-degree upward sway, the image stabilization process of the modified equirectangular projection program in step 408 compensates for this angular change by adjusting the projecting angle of the panoramic video images 3-degree downward.

Moreover, the above-described anti-shaking image stabilization process is performed continuously with time based on the received time-sequence of video images and the associated determined angular and linear position changes which are also time-varying. In some embodiments, the image stabilization process may be performed in real-time as the raw video images and sensor signals are being collected, and the stabilized shake-free panoramic video images are subsequently stored/streamed/uploaded in place of the raw video data.

One notably feature of the present technique lies in that because the anti-shaking image stabilization operation to compensate for the unwanted movements of the panoramic camera system is performed on panoramic video images which have an ultra-wide to full spherical field of view, the above-described image shifting and rotation adjustment does not cause any clipping artifact in the stabilized panoramic video images nor does it reduce the field of view of the stabilized panoramic video images (i.e., they remain to have full spherical field of view). However, this is not the case when such a compensation technique is applied to images captured by a single-lens camera. In the latter case, image shifting and rotation operating would almost certainly cause clipping artifact along one or more edges of the corrected images and also associated with reduced field of view.

Figure 5:
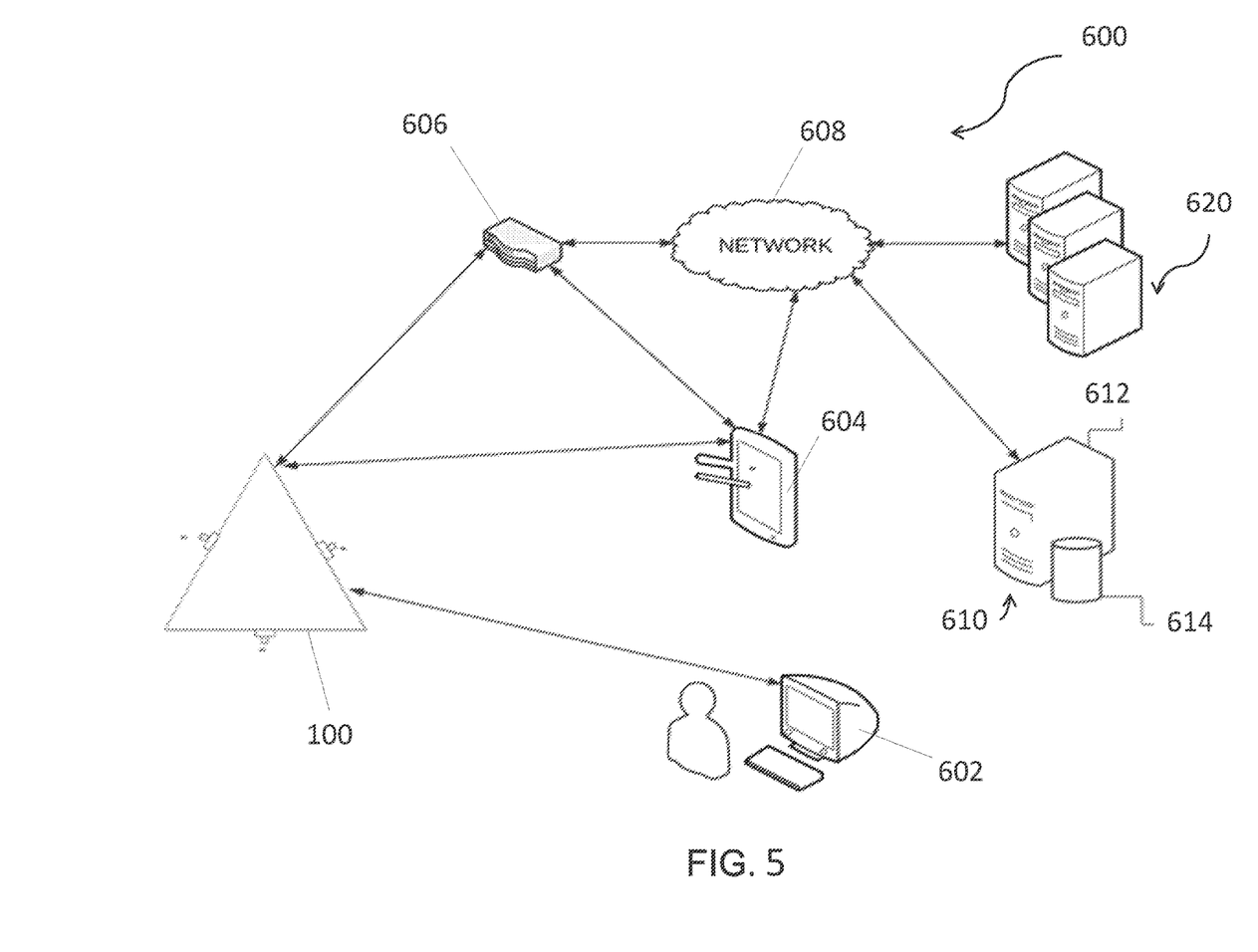
FIG. 5 illustrates an example network environment which provides for capturing and processing panoramic photographs and videos.

FIG. 5 illustrates an example network environment which provides for capturing and processing panoramic photographs and videos. Not all of the depicted components may be used, however, and one or more implementations may include additional components not shown in the figure. Variations in the arrangement and type of the components may be made without departing from the scope of the subject technology. Additional components, different components, or fewer components may be provided.

Network environment 600 includes panoramic imaging system 100X), computing devices 602 and 604 communicably connected to servers 610 and 620 via network 608. Computing devices 602 and 604 may access network 608 via wireless access point 606.

Each of computing devices 602 and 604 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 602 and 604 may be provided access to or receive application software executed or stored on any of other computing devices 602 and 604.

Server 610 can include computing device 612 and computer-readable storage device 614 (e.g., data stores). Each of servers 610 and 620 may be a system or device having a processor, a memory, and communications capability for providing content and/or services to the computing devices. In some example aspects, each of servers 610 and 620 can be a single computing device, for example, a computer server. In other embodiments, each of servers 610 and 620 can represent more than one computing device working together to perform the actions of a server computer (e.g., cloud computing). Further, each of servers 610 and 620 can represent various forms of servers including, but not limited to an application server, a proxy server, a network server, an authentication server, an electronic messaging server, a content server, a server farm, etc., accessible to computing devices 602 and 604. For example, server 610 may be a web server that delivers web content accessible through network 608.

A user may interact with the content and/or services provided by servers 610 and 620, through a client application installed at computing devices 602 and 604. Alternatively, the user may interact with the system through a web browser application at computing devices 602 and 604. Communication between computing devices 602 and 604 and servers 610 and 620 may be facilitated through network 608.

In some aspects, computing devices 602 and 604 may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

As described above with reference to FIG. 1, panoramic imaging system 100 of FIG. 1 includes cameras 101, 102 and 103, control system 110 and housing 120. In some aspects, panoramic imaging system 100 may be a handheld device with 360-degree panorama real-time recording and broadcasting capabilities. Panoramic imaging system 100 may be used to capture horizontal 360-degree panoramic image data within a front, rear, left and right direction of panoramic imaging system 100 and achieve real-time broadcasting and sharing of the image data. Panoramic imaging system 100 may generate 360-degree panoramic image data by imaging stitching and construction, and send to computing devices 602 and 604 via a wireless communication method, and/or store the encoded image data locally on panoramic imaging system 100, for example, on a Secure Digital (SD) Card.

In some aspects, panoramic imaging system 100 may send the generated 360-degree panoramic image data to computing device 604, for example, including a smartphone, for live broadcast via a wireless communication method. In some aspects, panoramic imaging system 100 may send the generated 360-degree panoramic image data to the cloud via wireless access point 606 to achieve cloud data storage and sharing. 360-degree panoramic image data in the cloud can be broadcast in computing device 604, such as smart devices and/or a web end device. In some aspects, panoramic imaging system 100 may send the 360-degree panoramic image data to computing device 602 for storage and playback via Universal Serial Bus (USB) 3.0 standard. In some aspects, panoramic imaging system 100 may send the 360-degree panoramic image data to computing device 602 for playback via a High-Definition Multimedia Interface (HDMI). In some aspects, panoramic imaging system 100 may store the encoded 360-degree panoramic image data in a SD Card on panoramic imaging system 100.

While this patent document contains many specifics, these should not be construed as limitations on the scope of any invention or of what may be claimed, but rather as descriptions of features that may be specific to particular embodiments of particular inventions. Certain features that are described in this patent document and attached appendix in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendix should not be understood as requiring such separation in all embodiments.

Only a few implementations and examples are described and other implementations, enhancements and variations can be made based on what is described and illustrated in this patent document.

What is claimed is:

1. A method of generating a stabilized panoramic video image output based on raw image data captured by a panoramic imaging system, the method comprising:
   receiving raw video images captured by the panoramic imaging system, wherein the panoramic imaging system is integrated with a set of position sensors;
   receiving multiple sets of sensor signals acquired by the set of position sensors concurrently when the raw video images are being captured;
   processing the multiple sets of sensor signals to determine unwanted position changes of the panoramic imaging system when the raw video images are being capturing; and
   performing an image stabilization operation on the received raw video images to compensate for the effects of the determined unwanted position changes, thereby generating stabilized panoramic video images based on the raw video images,
   wherein performing the image stabilization operation on the received raw video images to compensate for the effects of the determined unwanted position changes includes:
   feeding the received raw video images and the determined unwanted position changes into an equirectangular projection program;
   mapping, using the equirectangular projection program, each of the received raw video images from a two-dimension (2D) image to a spherical three-dimension (3D) image;
   compensating for the effects of the determined unwanted position changes by shifting and/or rotating the mapped spherical 3D images the same amount as the determined unwanted changes, but in an opposite direction to the determined unwanted position changes, of the panoramic imaging system; and generating stabilized panoramic video images using the compensated spherical 3D images.

2. The method of claim 1, wherein the panoramic imaging system includes a plurality of cameras and the raw video images include overlapping video images captured concurrently by the plurality of cameras.

3. The method of claim 1, wherein each set of the multiple sets of sensor signals include 3-axis of position signals.

4. The method of claim 1, wherein the set of position sensors includes an accelerometer sensor, a gyroscope sensor, and a magnetometer sensor, and each of the accelerometer sensor, the gyroscope sensor, and the magnetometer sensor generates 3-axis of position signals.

5. The method of claim 1, wherein processing the multiple sets of sensor signals to determine the unwanted position changes of the panoramic imaging system includes:

filtering the multiple sets of sensor signals to remove sensor noises from the received sensor signals;

determining instantaneous positions of the panoramic imaging system from the filtered sensor signals; and determining the unwanted position changes of the panoramic imaging system based on the determined instantaneous positions of the panoramic imaging system.

6. The method of claim 5, wherein filtering the multiple sets of sensor signals includes using a Kalman filter.

7. The method of claim 5, wherein determining the instantaneous positions of the panoramic imaging system from the filtered sensor signals further includes:

cross-calibrating the multiple sets of sensor signals acquired by the set of position sensors to remove false position changes from the multiple sets of sensor signals, wherein the multiple sets of sensor signals include redundant position information of the panoramic imaging system.

8. The method of claim 5, wherein determining the unwanted position changes of the panoramic imaging system based on the determined instantaneous positions of the panoramic imaging system further includes removing desired position changes of the panoramic imaging system from the determined instantaneous positions of the panoramic imaging system.

9. The method of claim 1, wherein the determined unwanted position changes include both angular position changes and linear position changes.

10. The method of claim 1, wherein the image stabilization operation is performed concurrently and in real-time as the raw video images and the multiple sets of sensor signals are being collected.

11. The method of claim 1, wherein shifting and/or rotating the mapped spherical 3D images to compensate for the effects of the determined unwanted position changes does not cause clipping artifact in the stabilized panoramic video images or reduce the field of view of the stabilized panoramic video images.

12. A panoramic imaging system, comprising:

a plurality of cameras having a field of view that overlaps with the field of view of at least one other camera among the plurality of cameras;

a set of position sensors configured to measure positions of the panoramic image system;

a controller configured to command each of the plurality of cameras to acquire raw video images and each of the set of position sensors to acquire a set of sensor signals, wherein the controller further includes:

a processor coupled to a memory, wherein the processor is configured to execute an image stabilization program stored in the memory, the program including the steps of:

receiving the raw video images captured by the plurality of cameras;

receiving the set of sensor signals acquired by the set of position sensors concurrently when the raw video images are being captured;

processing the set of sensor signals to determine unwanted position changes of the panoramic imaging system when the raw video images are being capturing; and performing an image stabilization operation on the received raw video images to compensate for the effects of the determined unwanted position changes, thereby generating stabilized panoramic video images based on the raw video images, wherein the system performs the image stabilization operation on the received raw video images to compensate for the effects of the determined unwanted position changes by:

feeding the received raw video images and the determined unwanted position changes into an equirectangular projection program;

mapping, using the equirectangular projection program, each of the received raw video images from a 2D image to a spherical 3D image;

compensating for the effects of the determined unwanted position changes by shifting and/or rotating the mapped spherical 3D images the same amount as the determined unwanted position changes, but in an opposite direction to the determined unwanted position changes, of the panoramic imaging system; and generating stabilized panoramic video images using the compensated spherical 3D images.

13. The panoramic imaging system of claim 12, wherein each set of the set of sensor signals includes 3-axis of position signals.

14. The panoramic imaging system of claim 12, wherein the set of position sensors includes an accelerometer sensor, a gyroscope sensor, and a magnetometer sensor, and each of the accelerometer sensor, the gyroscope sensor, and the magnetometer sensor generates 3-axis of position signals.

15. The panoramic imaging system of claim 12, wherein each of the set of position sensors is implemented as a set of microelectromechanical system (MEMS) sensors.

16. The panoramic imaging system of claim 15, wherein the set of MEMS sensors are isolated MEMS sensors.

17. The panoramic imaging system of claim 15, wherein the set of MEMS sensors is implemented as an integrated MEMS sensor module.

18. The panoramic imaging system of claim 15, wherein the system determines the unwanted position changes of the panoramic imaging system by:

filtering the set of sensor signals to remove sensor noises from the received sensor signals;

determining instantaneous positions of the panoramic imaging system from the filtered sensor signals; and determining the unwanted position changes of the panoramic imaging system based on the determined instantaneous positions of the panoramic imaging system.

19. The panoramic imaging system of claim 18, wherein the system filters the set of sensor signals using a Kalman filter.

20. The panoramic imaging system of claim 18, wherein the system determines the instantaneous positions of the panoramic imaging system by:
- cross-calibrating the set of sensor signals acquired by the set of position sensors to remove false position changes from the multiple sets of sensor signals, wherein the set of sensor signals include redundant position information of the panoramic imaging system.

21. The panoramic imaging system of claim 18, wherein the system determines the unwanted position changes of the panoramic imaging system by removing desired position changes of the panoramic imaging system from the determined instantaneous positions of the panoramic imaging system.

22. The panoramic imaging system of claim 1, wherein the system performs the image stabilization operation concurrently and in real-time as the raw video images and the set of sensor signals are being collected.

23. The panoramic imaging system of claim 1, wherein shifting and/or rotating the mapped spherical 3D images to compensate for the effects of the determined unwanted position changes does not cause clipping artifact in the stabilized panoramic video images or reduce the field of view of the stabilized panoramic video images.

\* \* \* \* \*